United States Patent
Fischer

[15] 3,685,943
[45] Aug. 22, 1972

[54] APPARATUS FOR THE MANUFACTURE OF HOLLOW OBJECTS OF THERMOPLASTIC MATERIAL

[72] Inventor: Stefan Fischer, Im Korresgarten 21, Lohmar (Bez. Cologne), Germany

[22] Filed: Aug. 26, 1970

[21] Appl. No.: 67,091

[52] U.S. Cl. ................................ 425/326, 425/387
[51] Int. Cl. ............................................ B29d 23/03
[58] Field of Search ......... 18/5 BA, 5 BJ, 5 BB, 5 BP; 425/324, 326, 342, 387

[56] References Cited

UNITED STATES PATENTS

| | | | |
|---|---|---|---|
| 3,100,913 | 8/1963 | Matteo | 18/5 BJ X |
| 2,930,079 | 3/1960 | Parfrey | 18/5 BA X |
| 3,264,684 | 8/1966 | Moslo | 18/5 BJ |

Primary Examiner—H. A. Kilby, Jr.
Attorney—Lilling and Siegel

[57] ABSTRACT

An apparatus for the production of hollow plastic articles including an extruder, an injection mould and a blowing mould, and means opening and closing the moulds being driven by the same drive source.

14 Claims, 4 Drawing Figures

INVENTOR
STEFAN FISHER
BY Lilling + Siegel
ATTORNEYS

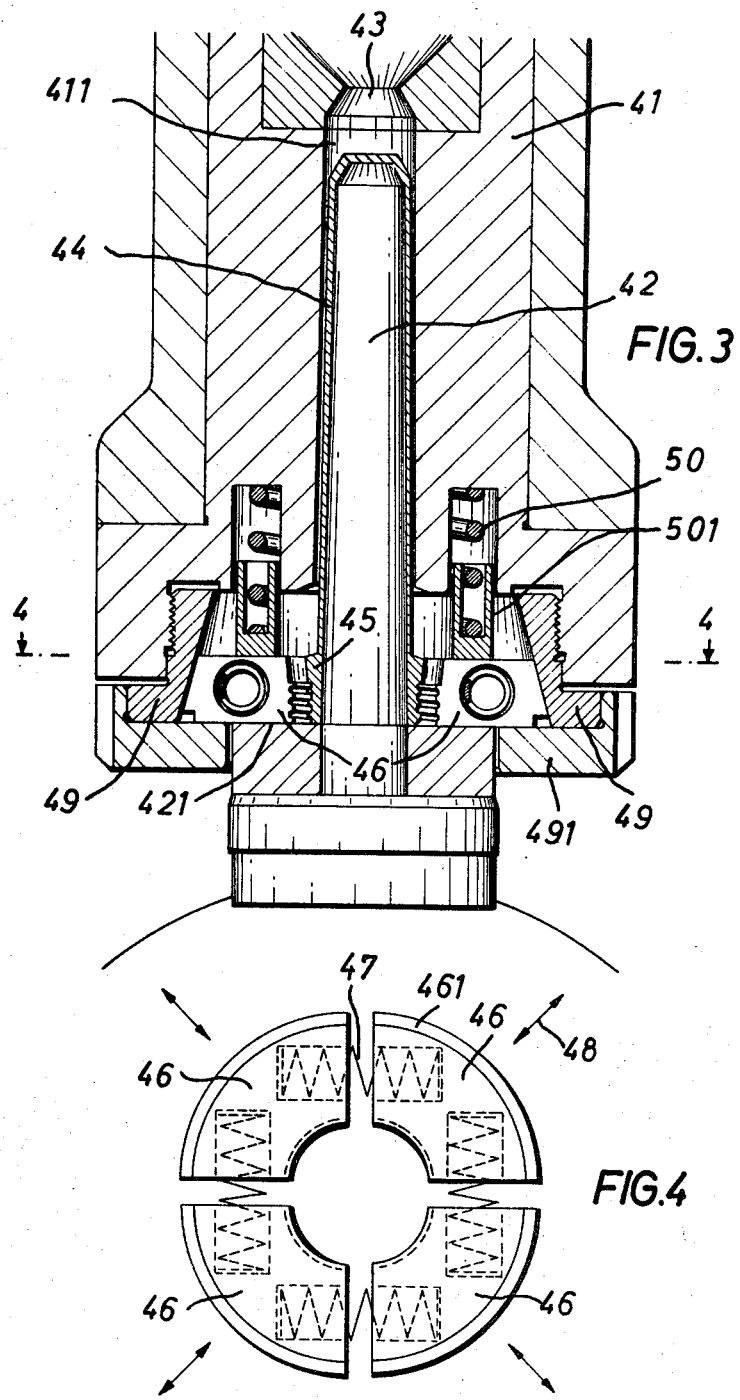
INVENTOR
STEFAN FISHER
BY Lilling + Siegel
ATTORNEYS

APPARATUS FOR THE MANUFACTURE OF HOLLOW OBJECTS OF THERMOPLASTIC MATERIAL

BACKGROUND OF THE INVENTION:

This invention relates to an apparatus for the production of hollow articles from thermoplastic synthetic plastic material.

The invention concerns the production of hollow articles, especially bottles, from thermoplastic synthetic plastic material and primarily the production of hollow articles by what is called the injection and blow-moulding process, in which firstly an injection-produced pre-moulding is formed in an injection mould, which pre-moulding is subsequently inflated in a blowing mould into the finished article. An apparatus for the production of such hollow articles thus needs two moulds, an injection mould and a blowing mould, which must be opened and closed in the working sequence of the apparatus so that the finished article can be taken in each case from the mould.

The invention seeks to simplify and cheapen such apparatuses which work with two moulds which are opened and closed in the working sequence of the apparatus, and at the same time to make them more operationally reliable. For this purpose, in an apparatus for the production of hollow articles from thermoplastic synthetic plastic material having an extruder and two moulds, for example an injection mould and a blowing mould, and devices for the opening and closing of these moulds, the invention provides that the same drive source serves for the opening and closing of both moulds. In this case the drive apparatus can act directly upon the one mould and the drive of the second mould can be derived from a part which is moved in the drive of the first mould. By these measures not only is a second drive device for the second mould with the associated control devices saved, but it is also ensured that the drive of the two moulds takes place synchronously in every case. The same drive device should furthermore also serve for the drive of a transport device which brings the articles to be manufactured from one mould into the other. The drive of this transport or transmission device does not need to be effected directly by the drive device, but can be derived from a part which is moved in the drive of the moulds.

In a preferred form of embodiment of an apparatus according to the invention which serves for the production of bottles by the injection and blow-moulding process, two spars are mounted in the machine frame on both sides of the injection mould and parallel with the axis thereof, for displacement by the drive device, which spars carry the mould core of mandrel form extending in the axial direction from one end into the injection mould, and a transverse piece which is connected with the drive elements for the opening and closing movements of the blowing mould. When the mould core of the injection mould is conducted or moved by the spars in the axial direction out of the injection mould, that is the injection mould is opened along the axis of the blowing mandrel in the injection mould itself, namely, parallel to the axis of the two spars. The opening of the blowing mould takes place in synchronism therewith, through the transverse piece, and in contrast thereto, at least in the beginning of its movement, the motion or movement of the blow mould is substantially at right angles to the corresponding motion of the injection mould. In this case, if one arranges the blowing mould directly beside the injection mould, one can use the mould core of the injection mould as transmission device between injection mould and blowing mould and also as blowing mandrel. In this case again four mould cores and blowing mandrels are expediently provided which can be conducted successively, with intermittent pivoting through 90° in each case, out of the region of the injection mould into the region of the blowing mould.

The invention further provides an opening and closing device for the moulds of synthetic plastic processing machines, which is designed primarily for the opening and closing of the blowing mould in the apparatus as described above, and in which according to the invention the two mould halves of the blowing mould are carried by pivot arms which are articulatedly connected with one another at their ends remote from the mould halves and with which there engage guide or support links with their one ends, which are articulated by their other ends of the machine frame and extend, when the mould is closed, in the same or approximately the same direction, while on their pivoting achieved by a displacement of the articulation point of the pivot arms they guide the pivot arms apart. In this case the drive source is expediently caused to act upon the connection joint of the pivot arms for the mould halves. Naturally it is also possible in kinematic reversal, to arrange the connection joint of the pivot arms of the mould halves and thus the latter themselves non-displaceably and to move the articulation points of the guide or support links back and forth in order to close and open the mould halves.

In such apparatuses it is advantageous to work with what are called one-piece injection moulds, that is to say moulds which possess an undivided mould body into the mould cavity of which a mould core extends from one side, which core can be withdrawn from the mould cavity together with the formed pre-moulding for removal of the latter from the mould. In this arrangement difficulties occur in the cases where pre-mouldings with threaded pieces on the bottle neck or undercut outlines must be produced, on account of the removal of the pre-moulding from the mould.

In order to overcome these difficulties without the necessity of dispensing with the advantages of the single drive for the opening and closing of the two moulds, it is further provided according to the invention that in the opening of the injection mould together with the mould core withdrawable from the mould cavity, at least parts of the injection mould are movable in the direction of movement of the mould core and at the same time or thereafter are movable apart from one another. The control of this movement of the movable injection mould parts can be effected by the mould core itself or by parts connected therewith. Furthermore the movable parts can be subject to spring pressure and movable in the one direction of movement against the pressure of this spring or these springs. In this way one arrives at a preferred form of embodiment of an apparatus according to the invention in which the movable mould parts are guided by slideways in their movement and are subject to the influence of springs pressing them in the direction of the movement of the mould core and also to the influence of springs which hold them in abutment on the slideways and at the same time move them apart. In one particular form of embodiment of such an apparatus having an injection mould for the production of a pre-moulding with a threaded bottle neck, four neck mould pieces are provided for the bottle neck, which together form a ring which is provided on its outside with a tapered surface widening in the direction of movement of the mould core, which pieces abut on a corresponding tapered surface of the mould as sliding surface and are guided thereon, under the influence of springs which spread the ring parts apart, while under the influence of a spring acting in the direction of movement of the mould core they abut on a stop of the mould core or on the mounting thereof.

The invention permits many forms of embodiment. The invention will be explained in greater detail hereinafter by reference to a possible embodiment of an apparatus according to the invention, with the parts essential to understanding, and a possible embodiment of an injection mould usable in combination therewith for the formation of a pre-moulding having an external threading, as subsequent bottle neck, with the parts essential to understanding, which are represented partially diagrammatically and partially in section in the accompanying drawings, wherein:

FIG. 3 shows a longitudinal section through a part of an injection mould with the mould parts for the bottle neck; and FIG. 4 shows a section approximately along the line 4—4 of FIG. 3.

DESCRIPTION OF THE PREFERRED EMBODIMENT

Figure 1:
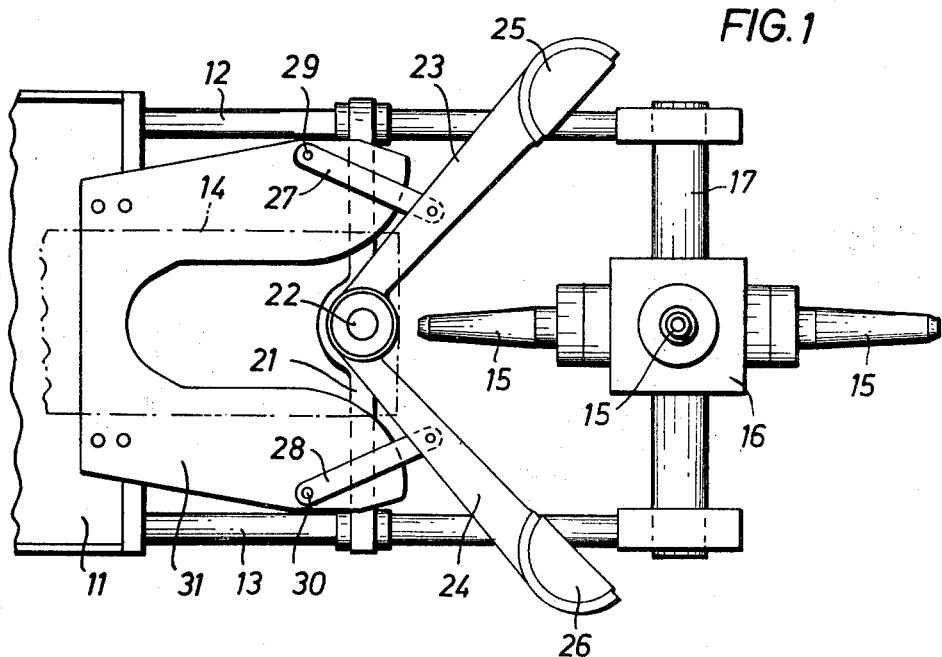
FIG. 1 shows the apparatus in plan view with moulds opened.
Figure 2:
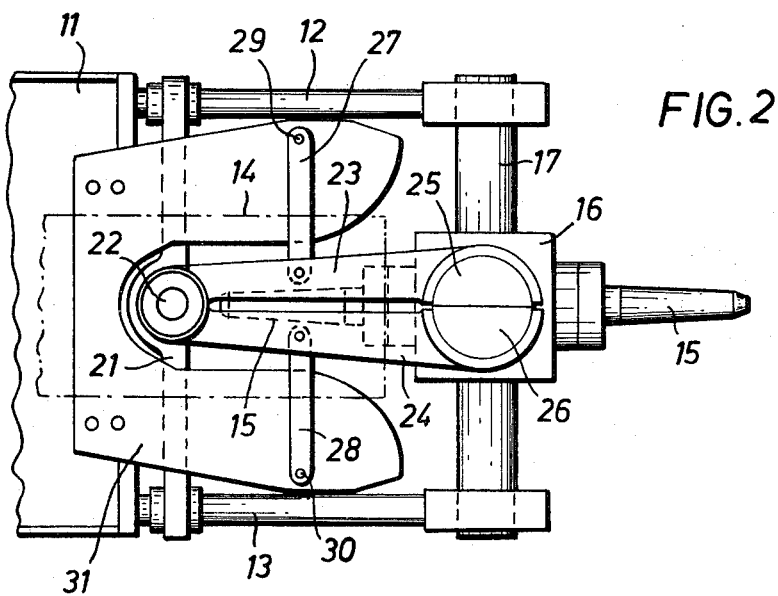
FIG. 2 shows the apparatus with moulds closed.

In the drawings, in FIGS. 1 and 2 the machine frame, carrying the extruder (not shown), is designated by 11. Two spars 12 and 13 are displaceably mounted in the machine frame, which spars are movable back and forth in the direction of their axis by a drive device (not shown) mounted in the machine frame 11, for example a hydraulic cylinder serving as drive source. The injection mould 14, indicated in dot-and-dash lines, is arranged between these two spars 12 and 13, into which mould a composition passage leads from the machine frame side, through which passage the extruder forces the synthetic plastic composition into the mould. From the opposite side, when the mould is closed (FIG. 2), the mould core 15 indicated in chain lines extends into the mould cavity (not illustrated particularly). This mould core 15 is carried by a hub 16 which is rotatably arranged on a spindle 17 carried by the spars 12 and 13. This hub 16 carries, as well as the mould core 15, three further mould cores of similar form of embodiment, which therefore are provided with the same reference. The hub 16 with the mould cores 15 is pivotable by drive means (not illustrated separately) intermittently through 90° at each movement in the working sequence of the machine.

The spars 12 and 13 further carry a transverse piece 21 which carries a spindle 22 on which two pivot arms 23 and 24 are pivotably arranged, each of which carries one of the two mould halves 25 and 26 of the blowing mould. A guide or support link 27 or 28 respectively is connected with each of these pivot arms 23 and 24, which link is articulated with its other end at 29 or 30 respectively to a bracket 31 of the machine frame.

When the moulds are in the closed position (FIG. 2) synthetic plastic composition is forced out of the extruder into the injection mould 14, into which the mould core 15 is introduced, until the entire mould cavity is filled. Then the injection mould is opened in that the spars 12 and 13 are moved to the right in the drawing and in this movement move the spindle 17 with the hub 16 away from the injection mould 14, in order to draw the mould core 15 with the pre-moulding seated thereon out of the mould cavity. Thus a position is reached such as is illustrated in FIG. 1. The hub 16 with the mould cores 15 can then be pivoted through 90° so that a fresh mould core comes to lie before the injection mould, and is pushed into the mould cavity by return of the spars 12, 13, whereupon a further pre-moulding can be formed by the injection of further synthetic plastic composition.

Together with the spars 12, 13 the transverse piece 21 arranged on these is moved forward and back. By this movement the two halves of the blowing mould 25, 26 are opened and closed. In the closed position the transverse piece 21, which carries the spindle 22 for the pivot arms 23, 24 of the mould halves 25 and 26 respectively, is situated in the withdrawn position close to the machine frame 11. The support links 27 and 28 acting on the pivot arms 23 and 24 lie approximately in one direction and somewhat in the manner of a toggle joint press the two mould halves 25 and 26 firmly against one another. If then the spars 12 and 13 are pushed forward, the transverse piece 21 displaces the pivot spindle 22, which has the result that the support links 27 and 28 are pivoted by the pivot arms 23 and 24 and in this action pivot the pivot arms themselves apart from one another, whereby the mould halves 25, 26 are opened.

The hub 16 arranged on the shaft 17 with the mould cores 15, which can be stepped further by 90° in the working sequence of the machine, serves at the same time as transport or transmission device between injection mould and blowing mould, and the mould cores 15 are so formed that they can serve in the blowing mould as blowing mandrels for the introduction of the blowing air. The transport device 15, 16 thus brings the pre-mouldings, after travelling through either a rotation angle of 90° (one step) or 270° (three steps), into the blowing mould for inflation.

In FIGS. 3 and 4 a possible embodiment for an injection mould for the production of pre-mouldings with threaded pieces is represented in greater detail. This mould can directly replace the mould 14 indicated in FIGS. 1 and 2, in which case no modifications need to be effected on the blowing mandrel and its mounting. In this form of embodiment commencement was made from a one-piece injection mould 41, into the mould cavity 411 of which a mould core 42 extends from one side, which is movable in the axial direction (downwards in the drawing) completely out of the cavity 411 and can then be brought with the pre-moulding situated thereon into a blowing mould. In the drawing, the position of the parts in relation to one another is illustrated which occurs when the core has moved back a short distance in its movement for removal from the mould. The one-piece mould 41 serves in combination with the mould core 42 for the formation of the body 44 of the injection pre-moulding, when the synthetic plastic composition is injected at its bottom at 43. For the formation of the threaded neck 45 there are provided four neck mould pieces 46 which together form a ring having a tapered external surface 461 on its periphery. Into the neck mould pieces 46 there are inserted springs 47 which each press two pieces lying against one another apart by two neighboring edges and thus expand the ring into the direction of the arrows 48.

The injection mould 41 is adjoined by a tapered ring 49 on which the neck mould pieces 46 are held in abutment by the springs 47. The neck mould pieces 46 bear with their lateral surfaces on the one hand on an annular stop 421 of the mould core 42, which is preferably formed as blowing mandrel, and on the other hand on the thrust ring 501 of a spring 50 which is arranged in an annular recess of the mould 41 and presses the neck mould pieces 46 away from the mould 41. A stop ring 491 connected with the tapered ring 49 serves for the limitation of the movement of the neck mould pieces 46 achieved by the spring 50.

The manner of operation of the apparatus can be recognized easily if one starts from the position of the parts in relation to one another as illustrated in the drawing. When on introduction of the mould core 42 into the mould 41 the position as illustrated is reached, the stop 421 strikes against the neck mould pieces 46 and takes them with it in its further movement, against the pressure of the spring 50, in the direction towards the mould 41, until they place themselves against the latter and the mould core 42 has reached its end position. The neck mould pieces 46 then slide with their tapered outer surfaces 461 on the tapered annular surface 49 and are thus moved towards one another until they lie tightly against one another. After the ensuing injection filling of the mould cavity thus formed, the mould core 42 is moved back again. The neck mould pieces 46 are then held in abutment on the stop 421 by the spring 50 so that they move in synchronism with the mould core. At the same time they are held in abutment by the springs 47 on the outwardly widening tapered ring 49, so that at the same time they are spread apart and liberate the threading. The mould core 42 with the pre-moulding 44, 45 seated thereon can then be moved through between the spread-apart neck mould pieces 46 and fed to the next operation.

What is claimed is:

1. An apparatus including an extruder, a drive source and having a frame and being adapted for the production of hollow articles from thermoplastic synthetic plastic material, comprising an injection mould and a blowing mould, and mechanical linkage means connected to said drive source for opening and closing said moulds, the closing and opening linkage means being driven by the same drive source and the opening and closing motions of said injection mould and blow mould occur in substantially mutually orthogonal directions.

2. The apparatus according to claim 1, wherein said drive source includes translatable spars disposed on opposite sides of said injection mould and parallel with the axis of said injection mould, and said drive source acts directly upon one of said moulds and the drive of said second mould is derived from a part which moves on driving of the first of said moulds.

3. The apparatus according to claim 2, wherein said translatable spars serve as the drive means for moving a transport device which brings the articles to be manufactured from one of said moulds into the other of said moulds.

4. The apparatus according to claim 3, wherein said drive means of the transport device is derived from a part which is moved in the driving of said moulds.

5. The apparatus according to claim 4, including two spars mounted horizontally in the frame on both sides of the injection mould and parallel with the axis thereof for displacement by the drive source, said spars carrying the mould core of mandrel form extending in the axial direction from one end into the injection mould, and a transverse element, said transverse element being connected with the elements of said mechanical linkage means for the opening and closing movement of said blowing mould.

6. The apparatus according to claim 5, wherein said blowing mould is adapted to be arranged directly beside said injection mould, and the mould core of said injection mould serves as said transport device between said injection mould and said blowing mould and serves also as said blowing mandrel.

7. The apparatus according to claim 6, wherein said transport device comprises four mould cores or blowing mandrels extending radially outwardly from a rotatable spindle which can be guided successively with intermittent pivoting through 90° each time out of the region of said injection mould into region of said blowing mould.

8. An opening and closing device having a frame, drive source and being adapted for moulds employed with synthetic plastic processing machines having an injection mould and a blowing mould, comprising two moulds halves carried by pivot arms which are articulatedly connected with one another at their ends remote from said mould halves and upon which guide links act with their one ends, said guide links are articulated with their other ends to the frame and extend substantially in the same direction when the mould halves are closed, while in their pivoting achieved by a displacement of the articulated connection point of the pivot arms they guide the pivot arms apart from one another.

9. The apparatus according the claim 8, wherein said drive source including translatable spars cooperatively acting upon the connection joint of the pivot arms of said mould halves.

10. The apparatus according to claim 9, wherein the opening of the injection mould, together with the mould core withdrawable from the mould cavity at least parts of the injection mould are movable in the direction of movement of the mould core and in this movement or thereafter are movable apart from one another.

11. The apparatus according to claim 10, wherein the control of the movement of the movable injection mould parts is effected by the mould core itself or by the parts connected therewith.

12. The apparatus according to claim 10, wherein the movable mould parts are subject to spring pressure and are movable in the one direction of movement against the pressure of the spring.

13. The apparatus according to claim 10, wherein the movable mould parts are guided in their movement by slideways and are subject both to the influence of springs which press them in the direction of movement of the mould core and to the influence of springs which hold them in abutment on the slideways and at the same time move them apart.

14. The apparatus according to claim 10, wherein in the production of a pre-moulding having a threaded bottle neck, a plurality of neck mould pieces are provided for the bottle neck, so as to form a ring which is provided on its outside with a tapered surface widening in the direction of movement of the mould core, said pieces abutting under the influence of springs which spread the ring parts apart upon a corresponding tapered surface of the mould as sliding surface and are guided thereon, and while under the influence of a spring acting in the direction of movement of the mould core they abut on a stop of the mould core or the mounting thereof.

* * * * *